United States Patent
Jördens et al.

(10) Patent No.: US 7,696,128 B2
(45) Date of Patent: Apr. 13, 2010

(54) CATALYTIC COATING FOR THE SELF-CLEANING OF OVENS AND STOVES

(75) Inventors: Frank Jördens, Traunstein (DE); Jürgen Salomon, Trostberg (DE); Gerhard Schmidmayer, Bad Endorf (DE); Bernhard Walter, Bernstadt (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 626 days.

(21) Appl. No.: 10/824,233

(22) Filed: Apr. 14, 2004

(65) Prior Publication Data

US 2005/0006436 A1    Jan. 13, 2005

Related U.S. Application Data

(63) Continuation of application No. PCT/DE02/03866, filed on Oct. 14, 2002.

(30) Foreign Application Priority Data

Oct. 15, 2001    (DE) .................... 101 50 825

(51) Int. Cl.
    *B01J 20/00* (2006.01)
(52) U.S. Cl. .............. 502/407; 502/202; 502/207; 502/300; 502/324
(58) Field of Classification Search .......... 502/202, 502/207, 232–263, 300, 324, 325–339, 407, 502/409, 414, 415; 219/391, 393, 396, 472, 219/522
See application file for complete search history.

(56) References Cited

U.S. PATENT DOCUMENTS

| 3,668,151 | A | * | 6/1972 | Walker | 502/329 |
| 3,888,790 | A | * | 6/1975 | Chay | 502/204 |
| 3,993,597 | A | * | 11/1976 | Stiles | 502/2 |
| 4,062,806 | A | * | 12/1977 | Roberts | 502/172 |
| 4,180,482 | A | * | 12/1979 | Nishino et al. | 502/2 |
| 4,359,039 | A | | 11/1982 | Uchikawa | |
| 5,051,185 | A | * | 9/1991 | Watanabe et al. | 210/635 |
| 6,517,899 | B1 | * | 2/2003 | Hoke et al. | 427/207.1 |

FOREIGN PATENT DOCUMENTS

| DE | 2828613 | 6/1978 |
| DE | 2928895 | 7/1979 |
| DE | 3019828 A1 | 5/1980 |
| DE | 19915378 A1 | 4/1999 |

* cited by examiner

*Primary Examiner*—Stanley Silverman
*Assistant Examiner*—Paul Wartalowicz
(74) *Attorney, Agent, or Firm*—James E. Howard; Andre Pallapies

(57) ABSTRACT

A part on or in a cooking, roasting, baking, or grilling device with a self-cleaning coating enables remnants of foodstuffs to be removed without mechanical action. The part includes a coating which has a structure comprised of (a) porous particles A, and (b) a binder, in which the porous particles A do not have a solid or liquid secondary phase in their pores (a).

23 Claims, 1 Drawing Sheet

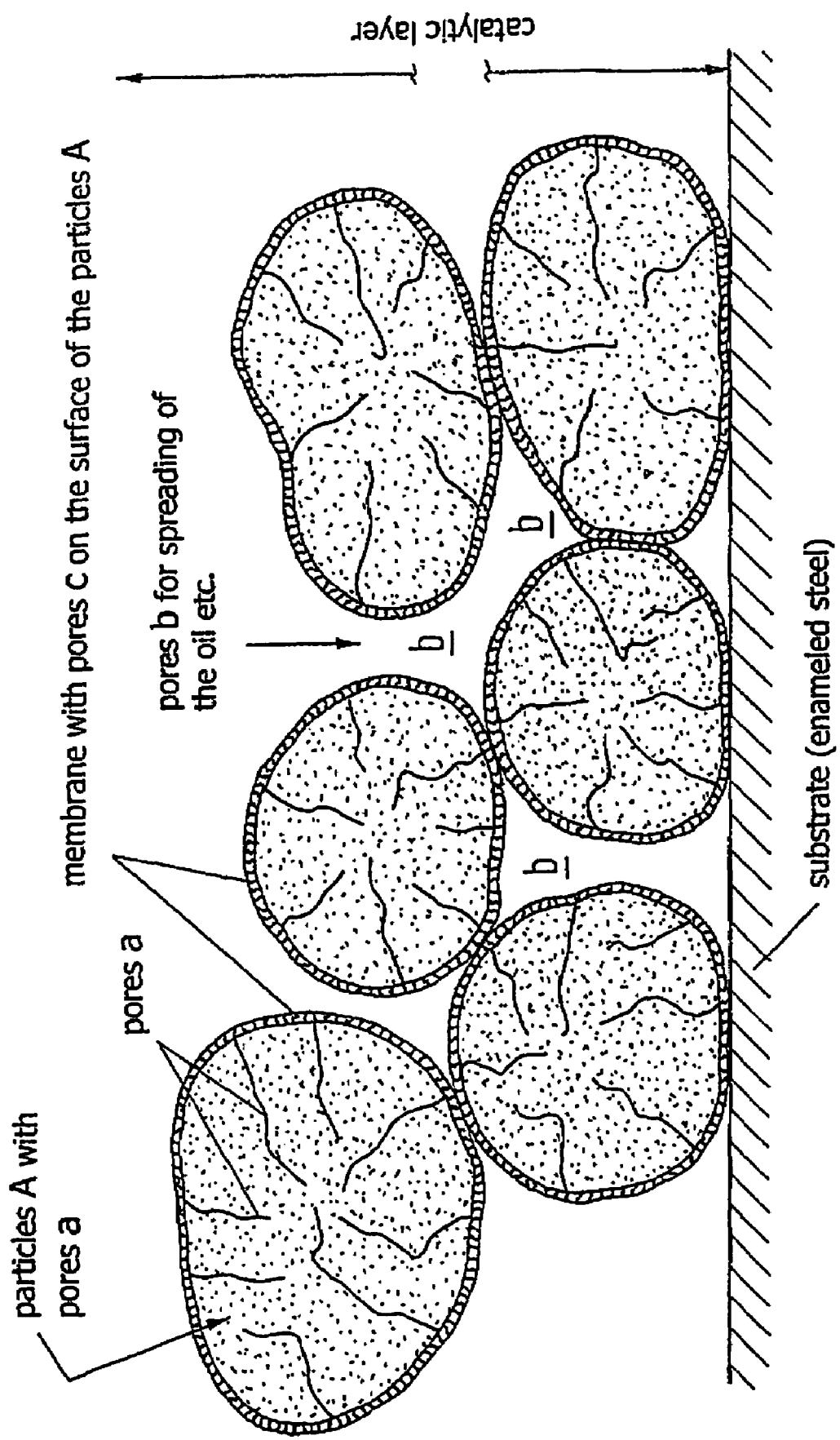

CATALYTIC COATING FOR THE SELF-CLEANING OF OVENS AND STOVES

BACKGROUND OF THE INVENTION

1. Field of the Invention

The present invention relates to cooking, roasting, baking, and grilling devices, as well as parts of these devices, in particular of ovens and stoves which are soiled with remnants of foodstuffs while in use. More specifically, the invention relates to such devices having their surface treated in such a way that such soiling can be better thwarted, and the surface of the device or of a part of the device appears clean even without mechanical cleaning.

2. Discussion of the Related Art

Self-cleaning stove coatings are already known from the state of the art. The first publication of a German patent application DE-A 28 28 613 describes a self-cleaning coating of articles that are heated while in use. The coating comprises a porous layer of a matrix of an inorganic binding agent with a matting agent on the surface of the articles. In this layer are distributed particles of a catalyst (which tends to change its color as a result of its catalytic action), and a non-discoloring substance. The catalytic action is provided by at least one of the metal oxides $Mn_2O_3$, $MnO_2$, or $CuO$ and/or by a solid acid catalyst, e.g. zeolite. A suitable group of non-discoloring substances are ferrites. As matting agents are proposed e.g. $Al_2O_3$, $SiO_2$, $TiO_2$, $ZrO_2$, $ZnO$, $CaO$, or $MgO$. The mentioned inorganic binding agents include frits of borosilicate glass, phosphate and lead frits and alkaline metal silicates.

Another self-cleaning coating is described in DE-A 29 28 895. On the article that is supposed to be self-cleaning, there is a coating film generated from a mass which comprises an oxidation catalyst, a synthetic silicone resin as binder, and an organic solvent (LM). The coating film is formed by heating of the mass to 300 to 400° C. The catalyst is preferably a precious metal, or a metal oxide or a mixture of two or more metal oxides, in particular Pt, Pd, or $MnO_2$, a Cu-oxide, a Fe-oxide, a Ni-oxide, or a Cr-oxide.

A coating for the fabrication of self-cleaning surfaces comprising an inorganic polymerization inhibitor is described in the printed specification of German patent DE-C 30 19 828. The coating mass required for the production of the coating is dispersed in a liquid binding agent that comprises an oxidation catalyst (metal or metal oxide) as well as the mentioned polymerization inhibitor. Liquid binding agents used include in particular silicone resins dissolved in organic solvents. Polymerization inhibitors used include in particular $Al(OH)_3$, $Sb_2O_3$, phosphate frit material or a mixture of at least two of these. The metal oxides/metals are oxides of V, Cr, Mo, Mn, Ni, and Cu, especially $MnO_2$, $Ni_2O_3$, $CuO$, or Pt and Pd, and especially colloidal Pt or Pd on $Al_2O_3$.

A coating that prevents or reduces unpleasant odors and surface soils is described in DE-A 199 15 378. The coating mass required for the production of the coating comprises (1) a polycondensate of (a) a silane or an oligomer derived thereof and (b) as necessary, a compound of glass-forming elements as well as (2) particles of a transition metal oxide with a diameter of 10 nm to 20 µm. The silane is a compound of the general formula $R_aSiX_{(4-a)}$ with a=0, 1, 2, 3, or 4, wherein R is a non-hydrolyzable radical, X is, in contrast, a hydrolysable radical. Examples of transition metal oxides are the oxides of La, Ce, Ti, Zr, V, Cr, Mo, W, Mn, Fe, Co, Ni, Cu, Ag, or Zn. During the production of the polycondensate or coating mass or thereafter, inorganic particles of nanometer or micrometer scale dimensions, mainly in form of a sol, may be added to the coating mass. Preferred inorganic particles are $Al_2O_3$, $SiO_2$, $SnO_2$, iron oxides, and C (graphite, carbon black). The proportions in size for the nanoscale particles are such that the particle size (diameter) is up to 300 nm. However, preferred particle sizes are up to 50 or up to 100 nm.

In the case of micrometer scale particles, a structuring of the coating and the generation of hollow spaces is caused. The particle diameter is 1 to 500 µm in this case. With these particles, $Al_2O_3$ and $SiO_2$ are also preferred, in particular kieselguhr, aluminum oxide 90, silica gel 40 or 60.

When these inorganic particles are used, they are impregnated with the transition metal oxide which leads to a decrease in the pore volume of the particles. In the described impregnation by means of salt solution, the inner and outer surfaces are coated which is advantageous for the reduction of unpleasant odors due to the large catalytically active surface (since gases, in contrast to oily substances, can also enter into small pores). This does not apply, though, to the prevention/removal of soils.

These alternatives for self-cleaning coatings that are described to date and are commercially available. They are all characterized by the fact that their self-cleaning ability noticeably decreases relatively fast over time. Hence, there is a need for better and longer lasting self-cleaning ability possessing coatings in or on cooking, roasting, baking, and grilling devices or their parts, and in particular in ovens and stoves. The quality and durability of the coatings/layers possessing self-cleaning ability of cooking, roasting, baking, and grilling devices may be determined according to DIN ISO 8291 in case of a layer thickness of at least 150 µm. The coatings known in the state of the art can withstand 5-10 cycles of soy bean oil dripping on them and subsequent heating to 250±10° C., before a pigmenting of the surface (assessment according to DIN ISO 8291 through appearance of gloss) occurs. To increase the number of cycles under the defined conditions is consequently the fundamental goal which the inventors of the present invention set out to reach.

The inventors of the present invention have looked for an alternative to this technically unsatisfying situation and confronted themselves with the problem of providing the possibility of changing the treatment of parts in or on cooking, roasting, baking, and grilling devices, in particular ovens and stoves, that with use are often soiled with remnants of foodstuffs, compared to the state of the art in such a way that at least 10-15 cycles according to DIN ISO 8291 are and remain self-cleaning, meaning the soiling by remnants of foodstuffs that occurs during cooking, roasting, backing, and grilling in a e.g. oven/stove on the inner surfaces of the muffles is avoided over a longer period of time (with equal or equally frequent use) without mechanical action and the baking oven muffle looks cleaner than is the case today with conventional coatings.

BRIEF SUMMARY OF THE INVENTION

Starting with the state of the art which basically qualitatively describes different coating masses or coatings, the inventors asked themselves whether it could be possible to achieve an improvement by other means. In particular, the thoughts of the inventors went in the direction of improving the structure of the coating to that effect, realizing that there is permanently a sufficient contact between the remnants of foodstuffs (below as a simplification referred to as "soil") on one hand and oxygen and (e.g. oxidic) solid phase (three phase boundary) on the other hand. This can be made possible by providing special hollow spaces, of which at least one kind functions by spreading/absorbing the mobile remnants of foodstuffs, and at least one other kind functions as an oxygen reservoir into which, however, the remnants of foodstuffs cannot enter. In this way, the surface on which the (thermal or oxidative) decomposition occurs is maximized, since oxygen is permanently present in the layer itself and the decomposition does not exclusively depend on oxygen supply from the surface and the sides. A sealing of the surface by large amounts of foodstuffs therefore does not lead to a blocking of the decomposition within the entire layer.

Furthermore, it is of importance that the surface of the cooking, roasting, baking, and grilling device or its parts remains mechanically stressable, which means maintaining the adherence of the coating to its substrate, its impact resistance, its chemical resistance, its resistance against temperature change as well as its scratch resistance must be satisfactory. These features are achieved with this invention.

BRIEF DESCRIPTION OF THE DRAWING

FIG. 1 is a schematic cross-section view of a coating according to the invention.

DETAILED DESCRIPTION OF THE INVENTION

According to the present invention, soil or remnant of foodstuffs are remnants of foodstuffs that are adequately liquefied at operating temperatures of the cooking, roasting, baking, and grilling device to be able to enter the structure of the self-cleaning coating. Fats/oils that are liquid at these operating temperatures, aqueous phases (e.g. salt solutions) and carbohydrates/proteins mixed with them may be of interest.

The above-described goal was achieved by the inventors of the present invention through the development of coatings with thermally (durable up to 500° C.) and chemically stable, porous oxides, in particular metal oxides, but also with stable carbides and nitrides.

The thermal decomposition and thereby the self-cleaning power of the nowadays conventional coatings of parts on or in cooking, roasting, baking, and grilling devices is limited, because the remnants of foodstuffs in the solid phase do not come in contact with sufficient amounts of oxygen which is required for the decomposition of the soils to (ideally) $CO_2$ and $H_2O$. The inventors therefore have provided layers with structures into which the soils can enter, in which they can be spread out and, in an ideal case, can be completely decomposed to $CO_2$ and $H_2O$.

Subsequently, the structure of the coating according to the present invention is described in more detail. The terms "Teilchen" (particle) and "Partikel" (particle) are thereby used synonymously. If the size of the particle is alluded to, their diameter is meant.

The coating with the ability to self-clean which is created comprises at least one kind of particles A with open porosity. The size of the particles is 5 to 100 µm. Preferred sizes are 10 to 80 µm, 20 to 60 µm as well as 30 to 50 µm. Pores "a" in the particles A are either of a dimension so that the soils cannot enter. According to experience the pores are below 1 µm, preferably 0.1 to 0.6 µm. In case of larger pores with a≧1 µm, the particles A are wrapped with a porous membrane (having pores "c"). This membrane prevents the entering of soils into the porous particles A. However, it also constitutes the so-called binding phase, thus allowing for the binding of the particles A among one another and to the substrate (to the surface). In case the pores "a" are sufficiently small (a<1 µm), the membrane exclusively has the binding function, i.e., the membrane does not necessarily have to be porous in such a case. In such a case (of sufficiently small pores a), since non-porous binder, e.g. glass, may be used, the particles A, however, are not completely wrapped, but preferably provided with the binder only at the contact points between two neighboring particles A. This guaranties, that as many as possible of the pores a remain accessible for air.

Chemically speaking, the particles A are, as mentioned above, thermally and chemically stable, porous oxides, in particular metal oxides, carbides, or nitrides. Representatives serving as examples are the substances listed further below for the particle B. However, as particles A especially preferred are γ—$Al_2O_3$ and $SiO_2$.

The spaces between the particles A (subsequently designated as pores b) are responsible for the entering and spreading throughout of the liquid remnants of foodstuffs in the layer. The goal is to have as good a distribution/spreading out of the soils in the layer as possible in order to maximize the working surface for the thermal decomposition. The size distribution of the pores "b" is essentially determined by the size of the particles A and the volume fraction of their binding phase. The amount of the binder that is to be used is easily determined by routine experiments, if it is taken into consideration, that the amount most advantageous according to the invention is so high that on one hand the spreading out in the pores "b" and, on the other hand, a sufficient quality of the mechanical properties (scratch resistance, adherence to the substrate) of the coating are ensured. The volume fraction of the binding phase is according to the invention 5-40%, preferably 20-30% or 15-25%.

The pores "b" between the particles A are distinctly larger than the pores "a" so that soils can enter into the structure and spread out. In this way, it is ensured that (enough) oxygen for the thermal decomposition is always in contact with the soils that are to be removed, in particular since the pores a always regenerate, i.e. may absorb air. FIG. 1 shows the structure of the particles, coating, and pores described herein.

All mentioned pore systems according to the invention, i.e. the pores "a" and "b" but also the pores of the binder, if existent, are open-porous.

The coating mass which constitutes the basis for the coating that is to be generated according to the invention, may, however, also comprise additional kinds of particles that serve for: (a) the reduction of the roughness of the coating and the improvement of the haptics; (b) the improvement of the binding, on one hand between the particles A and, on the other hand, between coating and substrate; (c) the adjustment of the color, or (d) the improvement of the thermal decomposition or the spreading ability (to name only a few examples).

Examples for particles that fall under (a) but also under (b) are nano-scale particles (particles B'), particles in the micrometer-range (particles B) as well as pigment particles (e.g., spinels), an example of (c) are spinels, and, lastly, an example of (d) are oxides of transition metals (La, Ce, Ti, V, Cr, Mo, W, Mn, Fe, Co, Ni, Cu, Ag, or Zn).

In case of the particles B and B', their chemical composition is of little importance. It is solely critical that the particles, as described above, are thermally and chemically stable. They may be porous, but do not have to be. Substances suitable as nanoscale or micrometer particles are oxides, especially metal oxides, carbides, and nitrides, for example $SiO_2$, $TiO_2$, $Al_2O_3$, $ZrO_2$, SiC, $Si_3N_4$, and $B_2O_3$, in particular. α—$Al_2O_3$. The selection of the material composition of the particles B and B' does not depend on the chemical composition of the particles A. That means, if the particles A are preferably $Al_2O_3$ according to the invention, the particles B or B' may also be $Al_2O_3$, but may just as well be $SiO_2$, $TiO_2$, $ZrO_2$, SiC, $Si_3N_4$, $B_2O_3$, or a spinel (or any other stable component).

However, of relevance is the size magnitude of the particles B and B'. The nanoscale particles B' have a diameter of up to 100 nm, but advantageously are only 20 to 60 nm. The particles in the micrometer range have a diameter of 0.5 to 10 μm instead, and these particles are also required to be at least five times, but at most twenty times smaller than the particles A.

According to an especially preferred embodiment, the pores "a" are free of solid or liquid secondary phases. This applies when used in cooking, roasting, baking, and grilling device, but also for when unused. In other words, it is especially preferred that the pores "a" do not take up or have any metal oxide, pigment, particles B or B', and also soils. According to this, the pores "a" are according to the invention either sufficiently small so that soils during the use of the devices on one hand, and metal oxide, pigment, particles B and B' etc. during the production of the coating on the other hand, may not enter into the pores "a", or are prevented from entering the pores "a" by means of the porous membrane (pores c) described above. Through this structure, in addition to the atmospheric oxygen in the pores "b", the atmospheric oxygen of the pores "a" is available for the thermal decomposition of the soils.

The porous membrane already mentioned above is a porous adhesive (subsequently also referred to as porous binder) or consists of such an adhesive. An inorganic temperature-resistant binder is thereby used, preferably an inorganic polymer (e.g. silicone resins and polymeric phosphates) or an inorganic sol, both on the basis of e.g., $Al_2O_3$, $SiO_2$, $TiO_2$, $ZrO_2$, $P_2O_5$, SiC, $Si_3N_4$, or $B_2O_3$ or mixtures thereof.

Further examples for the adhesive/binder are glass (e.g. open-cell, but also dense glass) that has only been heated to its deformation point ($T_E$) or to a temperature slightly below $T_E$, and silicates such as clays and water glass.

The size of the binder particles is known to be 100 nm or less in case of a sol, whereby the diameter of the particles may be 5 to 100 nm, preferably 20 to 80 nm. In case a binder on the basis of glass or clay etc. is used, diameters of 0.5 to 10 μm, in particular 1 to 5 μm, are preferred according to the invention.

According to a preferred embodiment, the coating or the coating mass exhibits a customary metal or metal oxide catalyst (oxidation catalyst and/or polymerization inhibitor). According to the present invention, basically all catalysts described in the state of the art for the self-cleaning of ovens are suitable. In this context, reference is made to the publications cited in the Background of the Invention. The use of oxides of La, Ce, Ti, V, Cr, Mo, W, Mn, Fe, Co, Ni, Cu, Ag, or Zn, especially $MnO_2$, $Ni_2O_3$, CuO, or $Cr_2O_3$ but also of Pt and Pd, is preferred according to the invention. Any mixtures of the mentioned oxides are also suitable as an oxidation catalyst/polymerization inhibitor according to the invention.

The metal oxide or the mixture of metal oxides exhibits particle sizes of below 100 nm to 0.5, 1, or even 2 μm. According to a preferred embodiment of the present invention, however, the catalyst exhibits particle diameters distinctly below 1 μm. The particle diameter is preferably 500 nm or less, 300 nm or less, 200 nm or less, and most preferably 100 nm or less.

A further preferred embodiment of the present invention provides that one or more substances which lower the temperature at which the catalyst exhibits a good conversion rate to temperatures of 200 to 250° C., are added to the catalyst. Substances in terms of this preferred embodiment are elements of the main groups 1 and 2 of the periodic table that is e.g., sodium, potassium, magnesium, calcium, or strontium.

The coating mass according to the invention comprises, according to a further preferred embodiment, an inorganic pigment or a non-discoloring material that is responsible for the covering of possibly occurring color changes that are the result of a change in the valence of the metal of the catalyst.

Suitable inorganic pigments are especially spinels such as $MgAl_2O_4$, $MgFe_2O_4$, $MnFe_2O_4$, $FeAl_2O_4$, $NiAl_2O_4$, or $MgCr_2O_4$. Other suitable non-discoloring materials are SiC and graphite. The particle diameter of the optionally used pigments is 0.2 to 5 μm, preferably 0.5 to 3 μm.

According to a further preferred embodiment, the coating exhibits optical mottling or granitization in order to conceal possible visual soils. In the former case, only one color component is used. In the case of granitization, at least two color components are used. Suitable color components are e.g. spinels, but also $Al_2O_3$, $TiO_2$, $ZrO_2$, and mixtures thereof. The diameter of these components is at 50 to 2,000 μm.

According to another preferred embodiment $SiO_2$ is used as particle A, $\alpha$—$Al_2O_3$ as particle B, and a nanoscale sol-gel-binder on the basis of $TiO_2$ or $TiO_x$, a spinel ($MnFe_2O_4$) with a diameter of 1-3 μm as pigment, and $TiO_2$ of a size of 500-1,000 μm as mottling. The particles A have a size of 30-50 μm and are used in an amount of 50-80, in particular 60-70 percent by weight. On the other hand, the particles B exhibit a size of 0.7-1 μm and are used in an amount of 10-20 percent by weight, especially 15-20 percent by weight. The sol-gel-binder accounts for 7-15 percent by weight, especially 10 percent by weight, and the pigment and the mottling each account for 1-3 percent by weight, whereby 2 and 1 percent by weight are particularly advantageous values.

According to the invention, the thickness of the coating amounts to at least 50 μm, preferably 100 to 500 μm, however, especially preferred are thicknesses of 150 to 450 μm, especially of 200 to 400 μm or 250 to 350 μm. Greater layer thicknesses are in fact technically feasible and also meaningful, however, due to economic reasons less interesting. However, should the thickness of the layer only amount to less than 50 μm, this does not provide a large enough pore volume of the pores "a", "b" and, where applicable, "c" for the uptake of soils (only in pores b) on one hand, and air (in pores a, b, c) on the other hand.

Parts of or in cooking, roasting, baking, and grilling devices within the meaning of the present invention are not only hang-in and slide-in parts for ovens and stoves, but also the inner surfaces of baking oven muffles that is the oven or stove interior (baking space), and deep fryers. In principle the coating applies to all metal, glass, with metal coated or enameled parts of devices such as ovens, stoves, grills etc that are directly or indirectly heated while in use and are not in direct contact with the food.

According to a preferred variant of the invention, the part that is to be coated concerns enameled parts, e.g. enameled steel which is steel that is provided with an enamel layer of a thickness of a magnitude of 100 μm that serves the protection from corrosion.

For the production of the self-cleaning coating according to the invention, three alternatives in particular are offered. According to the invention it is thereby preferred that the pores "a" remain free of any solid phase and consequently have maximum absorbing capacity for air. This may in particular be achieved by means of the fact that the used particles (pigment, particles B and B', metal oxide etc.) are not significantly smaller than the pores "a". Another possibility to keep the pores "a" free of solid phase exists in the use of particulate systems. Due to their zeta potential the particles do not enter into the pores, even if the latter are distinctly larger than the particles.

Subsequently, 3 different methods of production shall be briefly described.

Example I

In the first method, the particles A (e.g. $Al_2O_3$) are processed with an aqueous or organic (alcoholic) dispersed binder (the binder may in no case be present in a dissolved form, since in this case the pores "a" of the particles A will be filled with solid phase! The same applies to all optionally used/usable components) and optionally with (a) particles B and/or B' as well as (b) inorganic pigment (e.g. a spinel) and/or (c) one and/or further additives to a slip that is applied to the surface that is to be coated and is there dried into a so-called bisque. Then, firing takes place at 500 to 800° C., followed by and a cooling step which is, if necessary, followed by spraying-on of the e.g. metal oxide catalyst (MeO or $Me_2O$) e.g., in form of a (particulate) dispersion of metal oxide or metal hydroxide or metal oxy-hydroxide (e.g. $Me_2O$ $(OH)_2$). The removal of the solvent and the optional conversion of the salts into the oxide form take place thermally.

Example II

In a second variant of the production of the coating, the particles A are, if necessary, initially mixed with particulate metal oxide, metal hydroxide, or metal oxy-hydroxide or with particles B and/or B'. Subsequently, the mixture is dried and calcined, so that a powder that, where applicable, comprises MeO or $Me_2O$ is obtained. This powder is then processed, as in the first example, with an aqueous or organic (alcoholic) dispersed binder (it may not be a solution) and, if necessary, an inorganic pigment (e.g. a spinel) and further additives to a slip that is applied to the surface that is to be coated and is there dried into the bisque. Then, a firing takes place at 500 to 800° C. in which the layer is solidified and, where applicable, volatile components of the binding phase are expelled.

Example III

Finally, the third variant corresponds to Example II, with the additional requirement that the particles A are coated or sealed with an organic polymer (e.g. cellulose) so that they may be subsequently brought in contact with a solution of a metal nitrate, without the pores "a" being filled with metal nitrate (after the firing with metal oxide) or other slip components. By heating, not only is the metal nitrate converted into metal oxide, but rather the cellulose is pyrolyzed as well. The additional steps are identical to those from variant 2, i.e. a slip is prepared with dispersed binder.

In all three Examples, the application of the slip may take place electrophoretically by means of a spraying technique or dipping.

If the firing takes place at temperatures distinctly above 500° C. and the part to be coated concerns e.g. enameled steel, the enamel softens so that under sinking in of the layer an improved adherence between substrate and coating is achieved.

The invention claimed is:

1. A cooking, roasting, baking or grilling device having a substrate with a self-cleaning coating thereon, said coating comprising:
a plurality of particles having first pores therein, wherein spaces between adjacent particles form second pores which allow for solids and liquids to enter therein; and
a binder for binding said particles together at contacts points;
wherein said binder is a colloidal solution comprising one of an inorganic polymer and an inorganic sol, wherein said colloidal solution is formed with at least one of $SiO_2$, $TiO_2$, $Al_2O_3$, $ZrO_2$, SiC, $Si_3N_4$, and $B_2O_3$.

2. The device according to claim 1, wherein said porous particles are thermally and chemically stable porous metal oxides, carbides or nitrides.

3. The device according to claim 1, wherein said porous particles are at least one of $SiO_2$, $TiO_2$, $Al_2O_3$, $ZrO_2$, SiC, $Si_3N_4$, C and $B_2O_3$.

4. The device according to claim 1, wherein said porous particles have a diameter in the range of 5 to 100 microns.

5. The device according to claim 1, wherein said porous particles have open-cell pores.

6. The device according to claim 1, wherein said binder comprises particles having a diameter in the range of 0.5 to 10 microns.

7. The device according to claim 1, wherein said coating includes addition particles that function to at least one of, reduce the roughness of the coating, improve the binding between said porous particles, improve the binding between said coating and the substrate, adjust the color of said coating, or improve the thermal decomposition, the haptics or the spreading ability of said coating.

8. The device according to claim 7, wherein said additional particles are at least one of nanoscale particles, particles in the micrometer range, pigment particles, and metals.

9. The device according to claim 8, wherein said additional particles comprise at least one of metal oxides, carbides and nitrides.

10. The device according to claim 1, wherein the part or portion is a part or portion of a baking oven muffle.

11. The device according to claim 1, wherein the part or portion is a part or portion of an oven or a stove.

12. The device according to claim 3, wherein said porous particles are at least one of $Al_2O_3$ and $SiO_2$.

13. The device according to claim 6, wherein said particles have a diameter of about 1 to 5 microns.

14. The device according to claim 4, wherein said diameter is about 10 to 80 microns.

15. The device according to claim 4, wherein said diameter is about 20 to 60 microns.

16. The device according to claim 4, wherein said diameter is about 30 to 50 microns.

17. A cooking device having has a substrate with a self-cleaning coating thereon which enables remnants of foodstuffs to be removed without mechanical action, comprising:
the coating having a structure formed from a plurality of porous particles having pores therein and an inorganic binder being temperature resistant up to about 500 degrees C., wherein said inorganic binder includes an inorganic colloidal solution having $ZrO_2$ particles in liquid phase.

18. The device according to claim 1, wherein said inorganic polymer is one of a silicone resin and a polymeric phosphate.

19. The device according to claim 1, wherein said first pores are less than 1 µm in diameter in order to prevent a solid or liquid from entering therein.

20. The device according to claim 1, wherein said binder forms a membrane surrounding said particles, and said membrane includes pores which are small enough to prevent a solid or liquid from entering therein.

21. The device according to claim 20, wherein said binder is temperature resistant up to about 500 degrees C.

22. A substrate with a self-cleaning coating thereon, said coating comprising:
- a plurality of particles having first pores therein, the particles comprising at least one of a metal oxide, a carbide, and a nitride, wherein spaces between adjacent particles form second pores which are larger than the first pores such that the first pores prevent a solid or liquid from entering therein and the second pores allow for solids and liquids to enter therein; and
- a binder for binding said particles together at contacts points, wherein said binder is formed with at least one of a metal oxide, a carbide, and a nitride.

23. A substrate with a self-cleaning coating thereon, said coating comprising:
- a plurality of particles having first pores therein, the particles comprising at least one of a metal oxide, a carbide, and a nitride, wherein spaces between adjacent particles form second pores; and
- a binder for binding said particles together at contacts points, wherein said binder forms a membrane surrounding said particles, wherein said binder is formed with at least one of a metal oxide, a carbide, and a nitride, and wherein said binder forms third pores which are smaller than the second pores such that the third pores prevent a solid or liquid from entering therein and the second pores allow for solids and liquids to enter therein.

* * * * *